machine that the valve 236 is controlled automatically as well as manually. To this end, the rack bar 332 is provided at its upper end with an arm 334 upon which is pivotally mounted at 336 a lever 338, the opposite ends of this lever being connected respectively by links 340, at points equidistant from the fulcrum point, with the upper ends of the operating rack bars 210 and 214 through which movements are imparted to the cam shafts 58 and 146. It will thus be seen that when either of the rack bars 210 or 214 is moved upwardly in the operation of the machine, the rack bar 332 also is moved upwardly and by rolling the pinion 330 along the rack bar 328 raises the valve 236 enough to close the port 244 and thus stop the machine unless the operator is at the same time moving the hand lever 308 toward him at such speed as to counteract this tendency to close the port.

It will thus be evident that for every position of the hand lever 308 within the range of its operative movement there is a corresponding stopping position of the machine. By continuous movement of the hand lever the operator may cause the machine to run continuously until the operations upon the shoe have been completed, while at the same time maintaining the valve 236 under such control that by stopping the movement of the hand lever at any point desired he may cause the machine almost instantly to come to a stop at the point thus determined. In a similar way the operator is enabled to control the reverse movement of the machine and to bring the machine to a stop at any point desired. The limit of movement of the hand lever 308 toward the operator is determined by a stop screw 342, and when the hand lever arrives in position to engage this stop screw the machine is brought to a stop automatically with the wipers at the limit of their downward pressing movement represented by the point $g$ on Fig. 13. The machine will be provided with a similar stop to limit the movement of the hand lever in the opposite direction.

It will also be evident that by the speed of movement of the hand lever 308 the operator is enabled to determine, within limits, the speed of the machine in either forward or reverse movement. The speed of the machine will depend, of course, upon how widely the port 244 or the port 248 is opened, and the more widely either of these ports is opened, the faster the rack bar 332 will be operated. To cause the machine to run at a uniform rate of speed, the rack bar 328 must be moved at the same rate, whether fast or slow, as the rack bar 332, while to change the speed the rack bar 328 must be moved faster or slower than the rack bar 332. In practice the operator will naturally accustom himself to move the hand lever at a gradual and substantially uniform rate of speed, as if he were actually operating the machine by hand, the speed being slow enough to permit the machine to be brought to a stop at any point almost instantly by merely stopping the movement of the hand lever or, if preferred, by giving it a very slight reverse movement.

From the foregoing description it will be understood that while all the operations of the machine are performed by power and the shoe may thus be subjected to as heavy pressures as are needed to produce the best results without manual labor on the part of the operator, the machine nevertheless is under such control that each shoe may readily be subjected to such individual treatment as the operator deems necessary from his observation of the shoe as the operation of the machine proceeds. During the upwiping operation, for example, or at any time between or during repeated upwiping operations on the shoe, the operator may manipulate the margin of the upper by the use of hand pincers or a retarder, as customary heretofore in bed lasting machines. As hereinbefore explained, either the upwiping operation or the overwiping operation, or both these operations, may be readily repeated as many times as desired. After the upper materials have been wiped properly into lasted position, the wipers may be raised sufficiently to permit a binder wire to be readily drawn into place beneath them and the machine may then be stopped until the binder has been applied. Thereafter, if desired, the machine may be started forward to subject the upper materials again to downward pressure before the wipers are finally retracted to starting position.

While the invention is herein illustrated in its application to welt shoe work, it will be understood that the invention is not limited in utility to that kind of work but is likewise applicable to the lasting of various kinds of shoes.

Having described the invention, what I claim as new and desire to secure by Letters Patent of the United States is:—

1. A machine for shaping upper materials over a form having, in combination, upper shaping mechanism, power-driven means for effecting relative movement of said upper shaping mechanism and the form to shape the upper materials, and controlling means for bringing the machine to a stop at any point in the relative movement of said upper shaping mechanism and the form comprising a manually operated member adapted to determine variably by the extent of its movement the stopping position of the machine.

2. A machine for shaping upper materials over a form having, in combination, upper

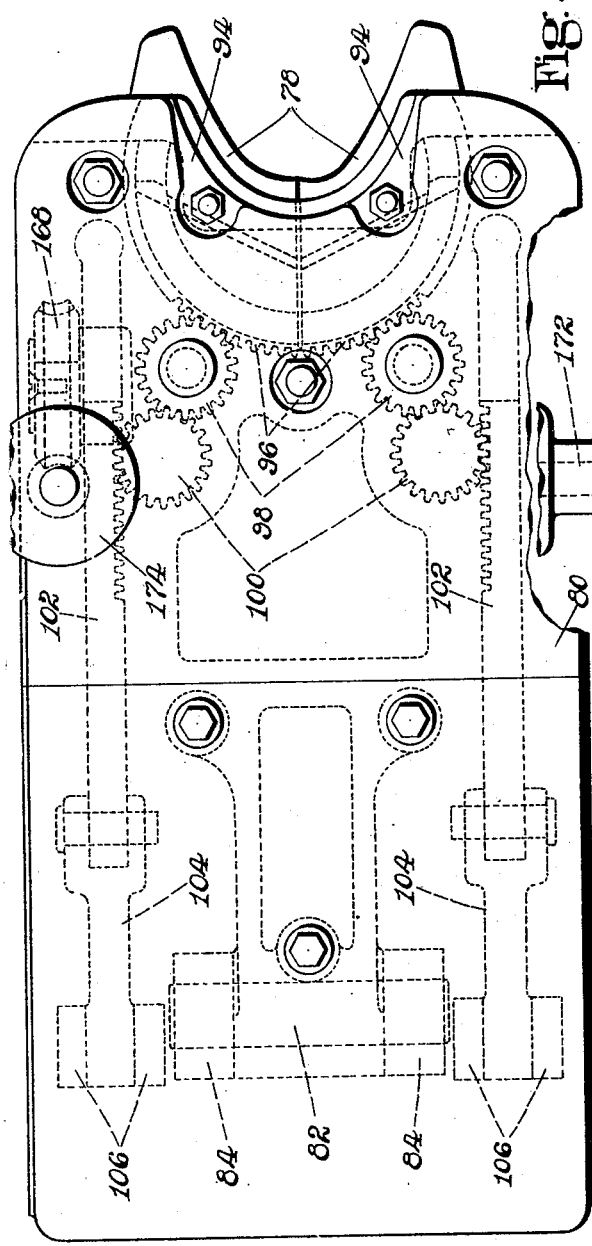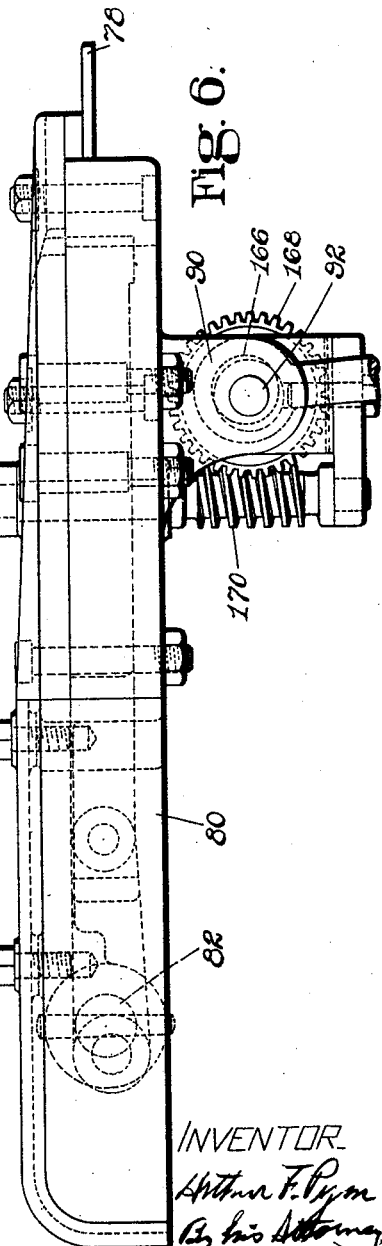

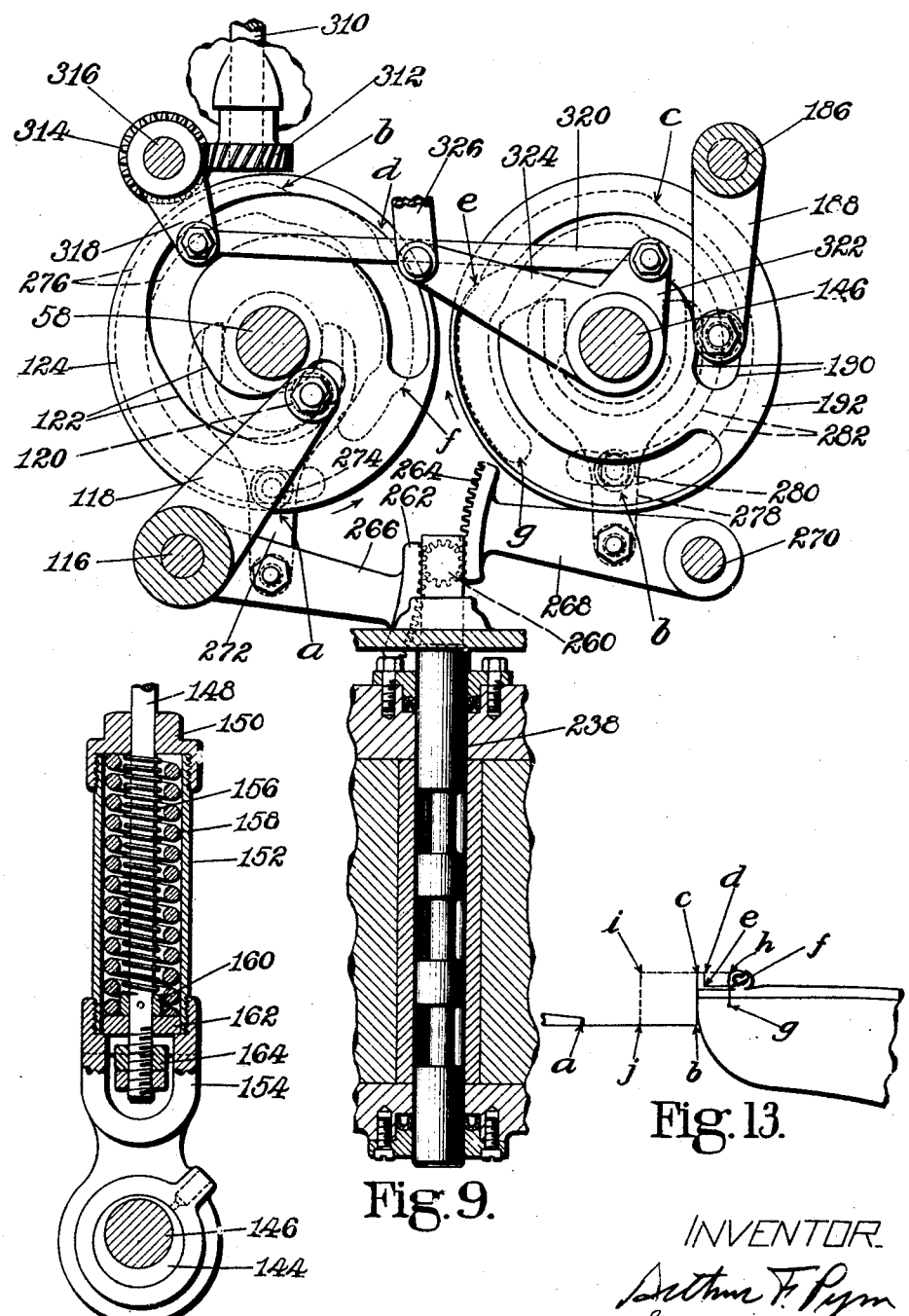

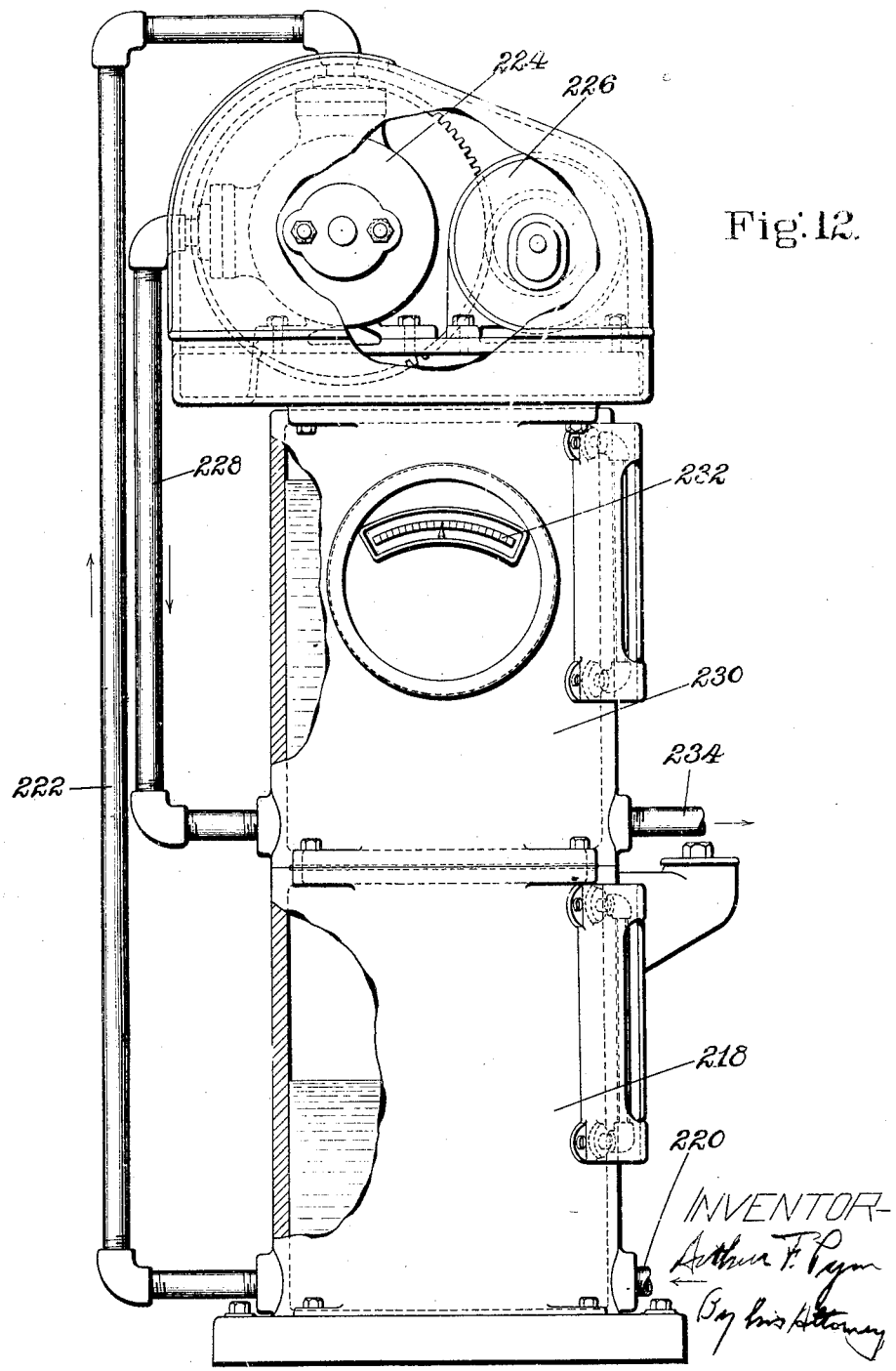

Patented July 31, 1928.

1,678,873

UNITED STATES PATENT OFFICE.

ARTHUR F. PYM, OF MARBLEHEAD, MASSACHUSETTS, ASSIGNOR TO UNITED SHOE MACHINERY CORPORATION, OF PATERSON, NEW JERSEY, A CORPORATION OF NEW JERSEY.

UPPER-SHAPING MACHINE.

Application filed January 26, 1925. Serial No. 4,810.

This invention relates to machines for shaping shoe upper materials over a form or last, and is herein illustrated in its application to a machine for lasting the toes of shoes by the use of toe-embracing wipers. It is to be understood, however, that in many of its useful aspects the invention is not limited to machines of the particular type illustrated.

It has been the usual practice heretofore in the manufacture of welt and other kinds of shoes to last the toes of the shoes by the use of machines having toe-embracing wipers which are operated manually to wipe the upper heightwise of the toe and to wipe its margin inwardly over the bottom of the last, i. e., to upwipe and to overwipe the upper. An important advantage in the use of machines of that type is that the operator has control at all times of the lasting operation, so that he may manipulate the margin of the upper materials at will by the use of hand pincers or of a suitable retarding or spreading tool, or may at will repeat any portion or all of the upwiping or overwiping operation, and thereby subject the upper of each shoe to such special treatment as it may require. There are, however, substantial disadvantages in the use of manually operated lasting means, since the labor involved is arduous and the output therefore restricted by the fatigue of the operator, and in view moreover of the fact that manual operation tends to result in lack of uniformity in the work and in the application frequently of less lasting pressure than would be desirable for the best results.

The present invention aims to overcome the disadvantages of manual operation in upper shaping machines by providing power operating means, while at the same time affording the operator such substantially full control of the operation of the machine as to permit each shoe to be readily subjected to such special treatment as conditions may render necessary or desirable. The machine herein shown is accordingly provided with such means for controlling its power operation as to enable the operator at will to start, stop or reverse the machine or to cause the machine to repeat any portion of its operative movement. The controlling means illustrated comprises a hand lever which by the extent of its movement in a forward or reverse direction determines variably the extent of the forward or reverse movement of the machine before the latter is brought to a stop and which may be utilized to determine by the speed of its movement the speed at which the machine runs in either direction. The operator thus has substantially as effective control of the machine as if he were operating it manually, and in fact, from the relation between the movements of the hand lever and the movements of the machine resulting therefrom, is substantially under the impression of operating the machine by the hand lever but without the labor incidental to such manual operation. While power operating means of different kinds may be utilized in the accomplishment of the objects of the invention, it is preferred, for the sake of ease and precision in the control of the machine, to provide fluid-pressure operating means, and the machine illustrated comprises an organization in which liquid under pressure is utilized as the operating medium.

A further advantageous characteristic of the machine shown is that the sequence of operations is determined automatically, thus relieving the operator of all care in this respect and also contributing to uniformity in the operation of the machine on different shoes. For this purpose the invention provides a novel organization comprising different fluid-operated members or plungers for effecting respectively different operative movements of the machine, with automatic controlling means to cause the different movements to take place in predetermined relation to one another. In the machine illustrated movements of the wipers heightwise of the toe and inwardly over the shoe bottom are effected respectively by different plungers, and an automatically controlled switch valve is provided for directing the operating fluid to the different plungers at different times.

The invention also provides means which acts automatically upon reversal of the machine at an intermediate point in its operative movement to effect relative reverse movement of the wipers and the shoe form or last in a different path from the operative movement to prevent any substantial reverse rubbing action of the wipers upon the upper materials. In the construction shown reversal of the machine at any point in the upwiping movement of the wipers results in retractive movement of the wipers from the end and sides of the toe before they receive their reverse movement heightwise of the toe, and reversal at any point in the overwiping and pressing operation results in immediate lifting of the wipers from the margin of the upper before they are outwardly retracted. This is accomplished in the machine illustrated by the automatic control of a switch valve which upon reversal of the machine determines the times when the operating fluid is directed to the different plungers for effecting respectively the different movements of the wipers.

The above and other features of the invention, including various details of construction and combination of parts, will now be more particularly described by reference to the accompanying drawings and pointed out in the claims.

In the drawings,

Fig. 1 is a view of the machine in front elevation, with a part of the casing broken away;

Fig. 5 is a plan view of the wiper head and the wipers;

Fig. 6 is a front elevation of the parts shown in Fig. 5;

Fig. 9 is a section on the line 9—9 of Fig. 4 showing the automatic switch valve and its operating connections for controlling the forward movement of the machine, and also a portion of the manual means for operating the main controlling valve shown in Fig. 8;

Fig. 10 is a section on the line 10—10 of Fig. 2 showing a portion of the means for imparting up-and-down movements to the wiper head;

Fig. 12 is a view in elevation, with parts broken away, showing the means for circulating the operating fluid, and Fig. 13 is a diagrammatic view illustrating the different movements of the wipers.

For positioning the last and its shoe materials in proper relation to the wipers, the machine herein shown comprises mechanism of the same character as that shown and described in my prior application Serial No. 698,099, filed on March 10, 1924, although it is to be understood that for this purpose any suitable means may be utilized which positions the work with substantial accuracy in relation to the path of movement of the wipers and holds it firmly against the pressure of the wipers. The machine has fast on its frame an arm 20 provided with a pin 22 adapted to project through a hole in the insole into a hole in the bottom of the forepart of the last to position the last. As more fully set forth in said prior application, the last will have been provided with a hole in predetermined relation to the contour of its toe end portion, and the pin 22 will be positioned in correspondingly predetermined relation to the wipers so that as the wipers are advanced and closed about the toe of the shoe their wiping edges will substantially conform to the contour of the end and sides of the toe at that point in their operation when they are about to begin to wipe the upper inwardly over the insole. It will be further understood that in this manner the last is positioned accurately in respect to tipping movements lengthwise and laterally thereof so that the bottom of the toe end of the shoe is presented in the best position for the effective operation of the wipers, the height of the shoe being determined by the arm 20 which serves as a holddown. All that the operator has to do in presenting the work is to mount the last on the pin 22 which serves as a pivot about which the last will be turned in one direction or the other in response to the pressure of the wipers thereon in case the shoe is not presented by the operator with its longitudinal axis pointing in exactly the right relation to the wipers.

Figure 2:
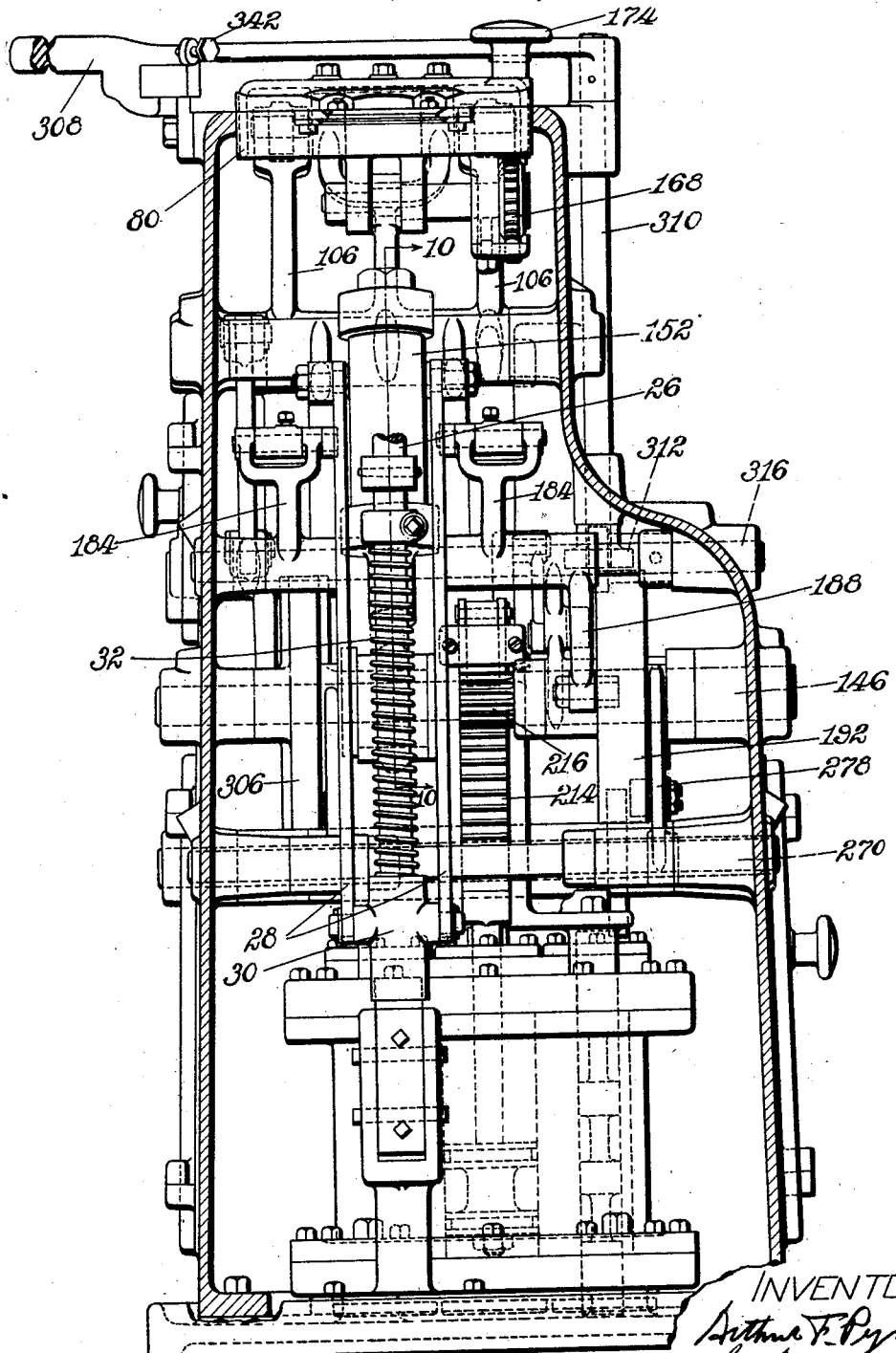
Fig. 2 is a right-hand end elevation of the machine with portions of the casing and of the shoe positioning means broken away.
Figure 3:
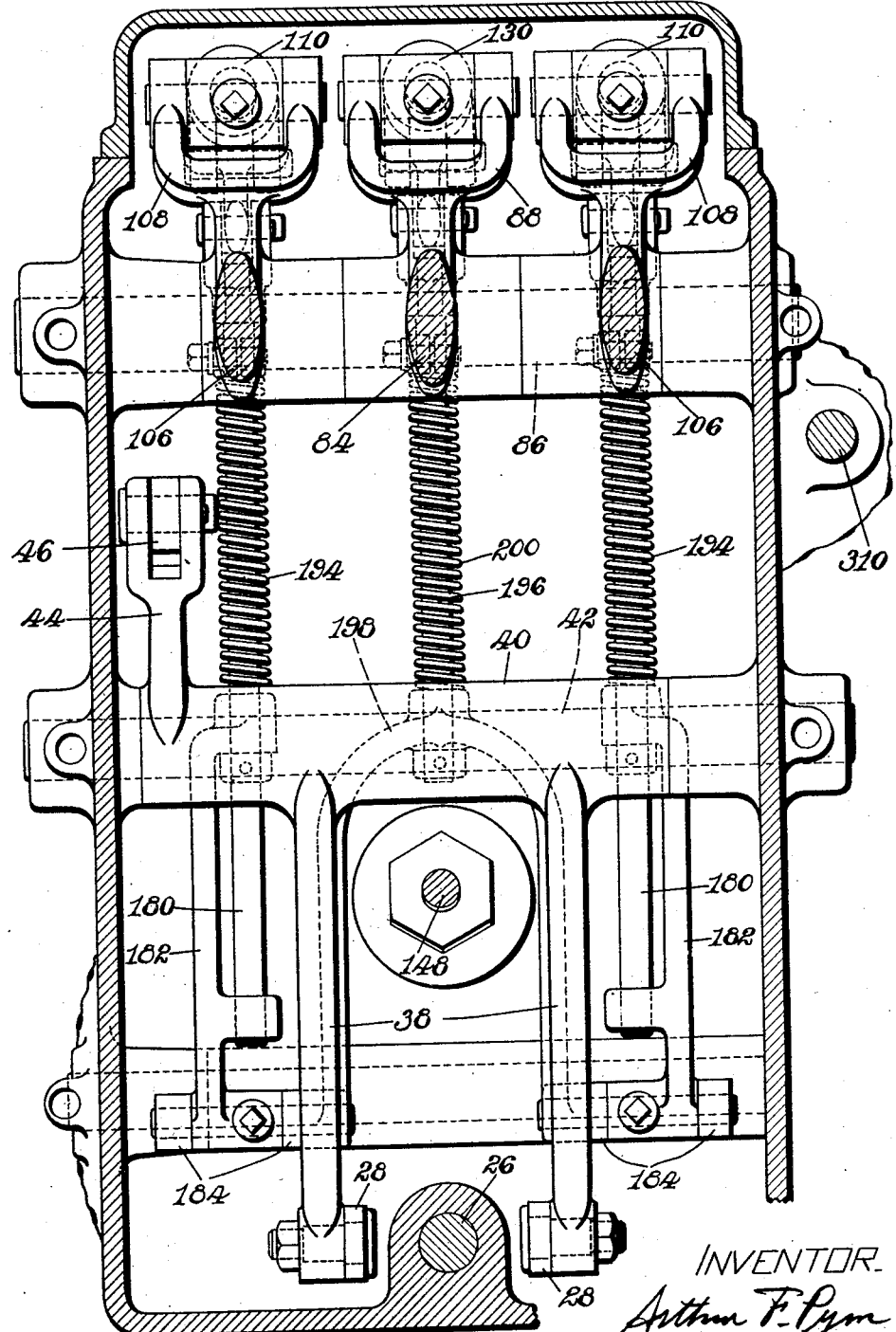
Fig. 3 is a section on the line 3—3 of Fig. 1.
Figure 4:
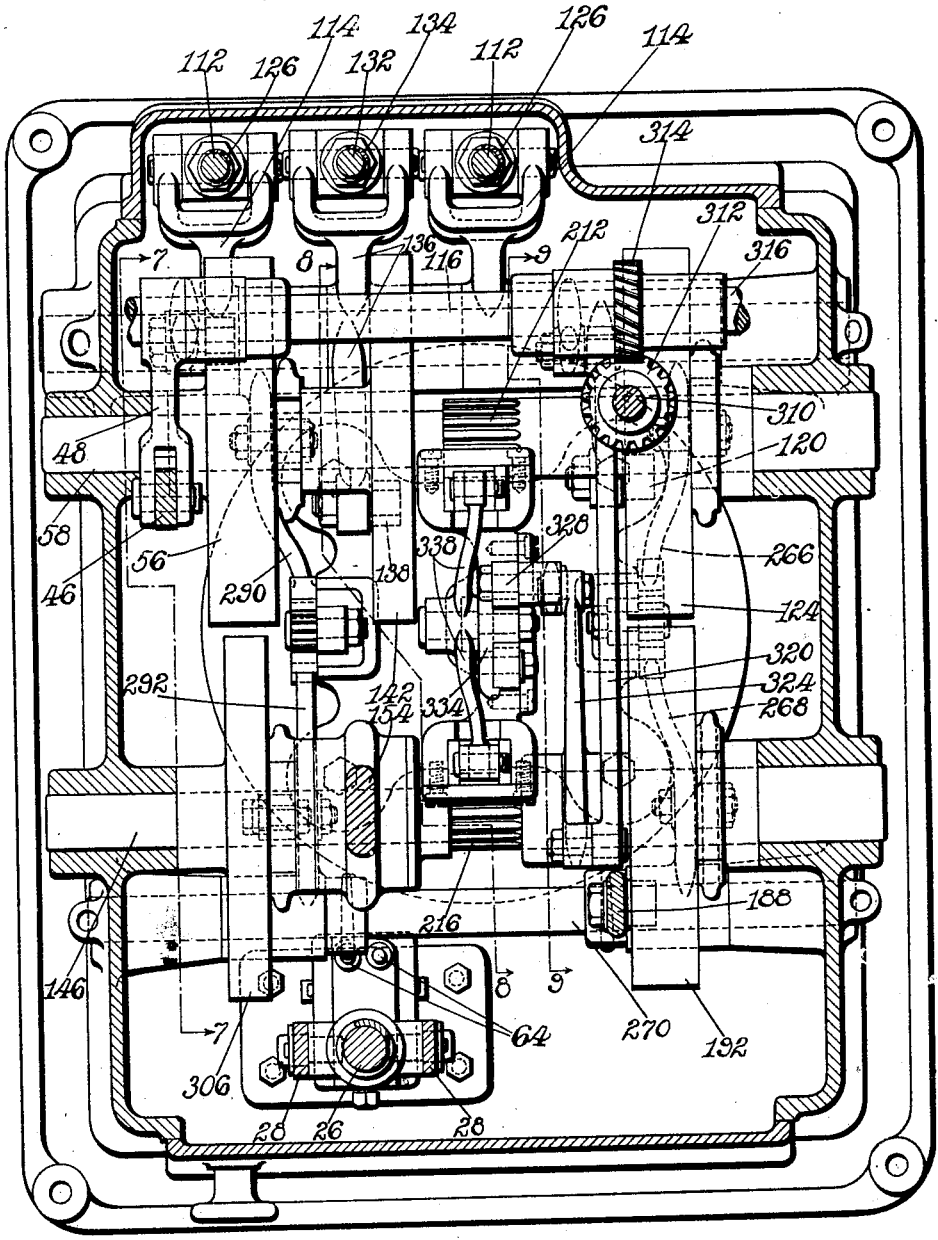
Fig. 4 is a section on the line 4—4 of Fig. 1.

By the automatic operation of the machine the shoe, after it has been mounted on the pin 22, is clamped upwardly against the holddown arm 20 by a toe rest 24 mounted on the upper end of a vertically movable rod 26 which slides in bearings in the frame of the machine. This rod is lifted by a pair of links 28 which are connected at their lower ends to a sleeve 30 mounted to slide on the rod and engaging a spring 32 which bears at its upper end upon a collar 34 fast on the rod 26. It will thus be seen that through the spring 32 the toe rest 24 is forced yieldingly upward against the foreport of the shoe. To limit upward movement of the toe rest in case the machine should be operated in the absence of any shoe, there is fast on the rod 26 a collar 36 which is arranged to engage that portion of the machine through which the upper end of the rod slides. The links 28 at their upper ends are operatively connected to lever arms 38 (Figs. 1 and 3), these arms being fast on a sleeve 40 mounted to rock about a fixed rod 42, and also fast on the sleeve 40 is an arm 44 connected by a link 46 to one arm 48 of a bell-crank lever the other arm 50 of which is provided with a roll 52 engaged by a path-cam 54 formed in one side of a cam wheel 56 which is fast on a cam shaft 58 (Fig. 4). The cam 54 is so formed and disposed in relation to other operating mechanisms hereinafter described that by its movement the toe rest 24 is moved upwardly into clamping position at the beginning of the operation of the machine.

In order to hold the shoe firmly against downward pressure of the wipers thereon, automatic means is provided for locking the toe rest rod 26 against downward movement. For this purpose the machine is provided with two pairs of pawls 60 (Fig. 1) which are fixed in respect to vertical movement and are arranged to engage ratchet teeth 62 formed on a member which is fast on the rod 26. The different pairs of pawls are controlled respectively by vertically movable rods 64 (Figs. 1 and 4) which are normally maintained at their limits of downward movement, determined by collars 66 on the rods, by means of springs 68. Fast on each rod 64 are collars 70 which are arranged to bear on the tail portions of the corresponding pawls 60 and thus to hold the pawls out of engagement with the teeth 62. The sleeve 30 is provided with an arm 72 arranged to engage collars 74 on the upper ends of the rods 64 when the toe rest has been forced upwardly against the shoe with adequate pressure, and thus to lift the rods 64 and through the action of springs 76 to force the pawls 60 into engagement with the ratchet teeth, thus locking the toe rest against downward movement. In the return of the parts to starting position the springs 68 act through the rods 64 to withdraw the pawls from engagement with the ratchet teeth as permitted by the downward movement of the arm 72. It will be understood that the use of a plurality of pawls 60 is for the purpose of greater precision in locking the toe rest in shoe-clamping position, the pawls being arranged in staggered relation to accomplish this object in a well-known manner.

For lasting the toe the machine is provided with a pair of toe-embracing wipers 78 supported on a wiper carrier or wiper head 80 which is pivotally mounted near its outer end upon a horizontal pin 82 carried by an upwardly extending forked arm 84 of a bell-crank lever mounted to swing about a fixed shaft 86, this bell-crank lever having a rearwardly extending arm 88 operated as hereinafter described. Near its opposite end the wiper head 80 is provided with depending brackets 90 having bearings for a shaft 92 which is supported as hereinafter more particularly described in such manner as to permit the wiper head 80 to move bodily lengthwise of the shoe in response to the action of the bell-crank 84, 88. The wipers 78 are secured to wiper holders 94 mounted to swing in arc-shaped guideways in the wiper head 80, these wiper holders being formed with rack teeth 96 which are engaged by pinions 98, the latter being engaged in turn by pinions 100 which are operated by rack bars 102 slidably mounted in the wiper head. It will be seen that movement of the rack bars 102 toward the right (Fig. 5) serves to swing the wipers 78 toward each other to close them about the toe of the shoe. At their outer ends the rack bars 102 are connected by links 104 to upwardly extending arms 106 of bell-crank levers which are also mounted to turn about the shaft 86, these bell-crank levers having rearwardly extending arms 108 which are pivotally connected to the upper ends of sleeve members 110. Extending upwardly within the sleeve members 110, and slidable therein, are rods 112 which are connected at their lower ends to corresponding lever arms 114 fast on a rock shaft 116. Also fast upon this shaft is a lever arm 118 provided with a roll 120 engaged by a path-cam 122 (Fig. 9) formed in one side of a cam wheel 124 which is fast on the shaft 58. On the rods 112 are springs 126 through which upward movement is imparted yieldingly to the sleeve members 110 to close the wipers with yielding pressure against the sides of the toe, the rods 112 being provided with pins 128 extending into slots in the sides of the sleeve members to limit relative movement of these members and the rods under the influence of the springs when the machine is idle.

For imparting forward movement to the wiper head 80 to advance the wipers bodily lengthwise of the shoe the bell-crank 84, 88 is operated by mechanism similar to that above described for operating the wiper-closing rack bars 102, including a sleeve member 130, a rod 132 and a spring 134 (Figs. 3 and 4) constructed and arranged substantially like the corresponding parts above described for operating the rack bars, the rod 132 being connected at its lower end to one arm of a lever 136 (Figs. 4 and 8) mounted to turn about the shaft 116, the other arm of this lever being provided with a roll 138 engaged by a path cam 140 formed in one side of a cam wheel 142 which is fast on the shaft 58.

By the above described mechanisms the wipers 78 are advanced and closed yieldingly about the toe, and in the machine shown they are thus brought initially into engagement with the shoe at some distance below the edge of the shoe bottom preparatory to an upwiping operation. For imparting to the wiper head 80 upwiping movement and thereafter downward movement to bring adequate pressure to bear upon the shoe during and after the overwiping operation, the shaft 92 hereinbefore mentioned is connected to an eccentric or cam 144 (Fig. 10) fast on a shaft 146. The connections comprise a rod 148 which has a bearing on the shaft 92 and is slidable within the head 150 of a casing 152 to the lower end of which is connected an arm 154 having a bearing on the eccentric 144. Within the casing 152 and bearing at their upper ends upon the head 150 are a light spring 156 and a heavy spring 158, these springs at their lower ends bearing respectively upon a collar 160 fast on the rod 148 and a washer 162 which is slidable within the casing 152 and is seated normally upon a shoulder formed on the arm 154. Below the washer 162, through which the rod 148 slides, this rod is provided with a nut 164. It will thus be seen that upwiping movement is imparted positively to the wiper head 80, the washer 162 engaging the collar 160 at this time as illustrated in Fig. 10, thus affording accurate control of the limit of the upwiping movement of the wipers. In the subsequent downward movement of the wiper head to produce adequate pressure of the wipers during and after the overwiping operation, resulting from further movement of the eccentric 144 after it passes its upper dead center, the light spring 156 will first yield, when the resistance of the shoe becomes great enough, until the washer 162 engages the nut 164, and thereafter further yield is permitted only against the resistance of the spring 158 in response to further movement of the casing 152. The force of the lighter spring 156 is thus utilized in the overwiping operation, and the heavier spring 158 comes into action substantially at the end of the overwiping operation, thus insuring adequate final pressure upon the margin of the upper.

To provide for vertical adjustment of the wiper head 80, as may be necessary to accommodate the wipers to different thicknesses of shoe upper materials, the shaft 92 is provided with an eccentric 166 upon which the rod 148 is mounted, and fast on the shaft 92 is a form gear 168 engaged by a worm 170 formed on an adjusting shaft 172 which is provided with a hand wheel 174. It will be seen that to adjust the wiper head it is only necessary to turn the hand wheel 174, since by the worm gearing the eccentric 166 is held securely in any position of adjustment.

While the springs 126 and 134 afford provision for yield in the initial closing and advancing movements of the wipers so that the latter are held yieldingly against the toe in the upwiping operation, as is desirable in view of the fact that different portions of the toe which the wipers engage in the upwiping operation may differ somewhat in contour, it is desirable, particularly in an automatic machine such as herein shown, that no such yield be permitted in the inward movement of the wipers in the overwiping operation, but that the wipers be advanced and closed positively a predetermined distance to wipe the upper against the rib of the insole. The machine is accordingly provided with means for rendering the springs 126 and 134 ineffective by locking together the sleeves 110 and the rods 112 of the wiper closing mechanisms and by similarly locking together the sleeve 130 and the rod 132 of the wiper advancing mechanism. To this end, there is mounted in each of the sleeve members 110 and 130 a friction clutch member 176 (Fig. 1), these clutch members being arranged to bear on the respective rods 112 and 132, and pivotally mounted on the respective sleeve members are cam members 178 for engaging the clutch members 176 and forcing them against the rods to lock the rods to the sleeves. Connected to those cam members 178 which are mounted on the sleeves 110 are rods 180 which are slidingly mounted in bearings formed in arms 182 (Fig. 3), the latter being pivotally connected to lever arms 184 which are mounted to rock on a shaft 186 and have connected rigidly thereto a depending lever arm 188 provided with a cam roll engaged by a path-cam 190 (Figs. 8 and 9) formed in one side of a cam wheel 192 fast on the shaft 146. Between the ends of the arms 182 and collars mounted on the rods 180 are springs 194 through which movements are imparted yieldingly to the corresponding cam members 178. For operating that cam member 178 which is mounted on the middle sleeve member 130 there is a rod 196 pivotally connected to this cam member and slidably mounted in a yoke-shaped member 198 (Fig. 3) the arms of which are connected to the two lever arms 184, a spring 200 being provided on the rod 196 to afford a yielding connection between the yoke member 198 and the rod. Through the operation of these locking mechanisms the wiper closing and advancing connections are rendered positive near the end of the upwiping operation and are thus maintained throughout the overwiping operation of the wipers so that the latter receive advancing and closing movements of definite extent predetermined by the shape of their operating cams.

From the foregoing description it will be seen that the machine is provided with two main cam shafts 58 and 146, that the cam shaft 58 has fast thereon cam wheels 56, 142 and 124 provided respectively with cams 54, 140 and 122 for operating the toe rest, for advancing the wipers and for closing the wipers, and that the cam shaft 146 has fast thereon the eccentric 144 for moving the wipers up and down and the cam wheel 192 provided with the path-cam 190 for locking the wiper closing and advancing connections. The operations effected or controlled by each cam shaft thus occur in automatically determined relation to one another, and the machine is further provided with means for operating the two cam shafts in automatically determined relation to each other, so that the machine as a whole has an automatically determined cycle of operations.

For operating the two cam shafts 58 and 146 fluid-pressure means is provided, comprising plungers 202 and 204 (Fig. 8) operating respectively in cylinders 206 and 208 at the base of the machine, the plunger 202 carrying a rack bar 210 engaging a pinion 212 on the shaft 58, and the plunger 204 carrying a rack bar 214 engaging a pinion 216 on the shaft 146. Operating fluid, preferably oil, may be supplied under pressure to the cylinders 206 and 208 by any suitable mechanism, for example such as that illustrated in Fig. 12. As there shown, a reservoir 218 is provided, which is adapted to hold oil under atmospheric pressure and through a pipe 220 receives the exhaust fluid from the cylinders 206 and 208. The fluid is drawn through a pipe 222 from the reservoir 218 by a pump 224 driven by an electric motor 226, and is forced by the pump through a pipe 228 into a reservoir 230 adapted to contain air under pressure above the oil. From the reservoir 230 the fluid is conducted through a pipe 234 (Fig. 1) to the power driving mechanism. It will be understood that a suitable supply of oil under pressure is maintained constantly in the reservoir 230 by the action of the pump which is controlled automatically in accordance with the pressure in the reservoir 230. For the purpose of such control any suitable well-known type of starting and stopping means may be utilized, not shown herein in detail but indicated generally at 232.

Figure 7:
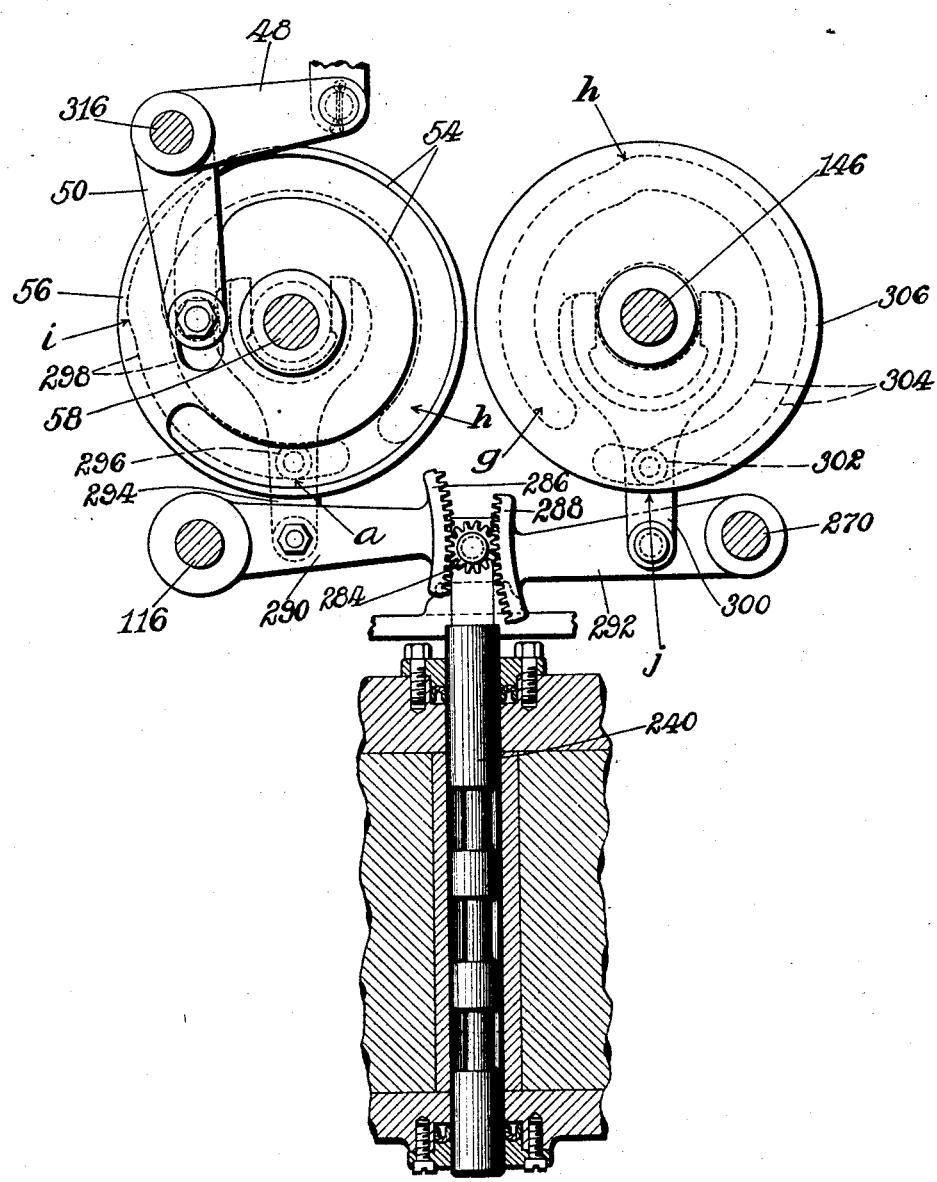
Fig. 7 is a section on the line 7—7 of Fig. 4 showing the reverse switch valve and its controlling mechanism.
Figure 8:
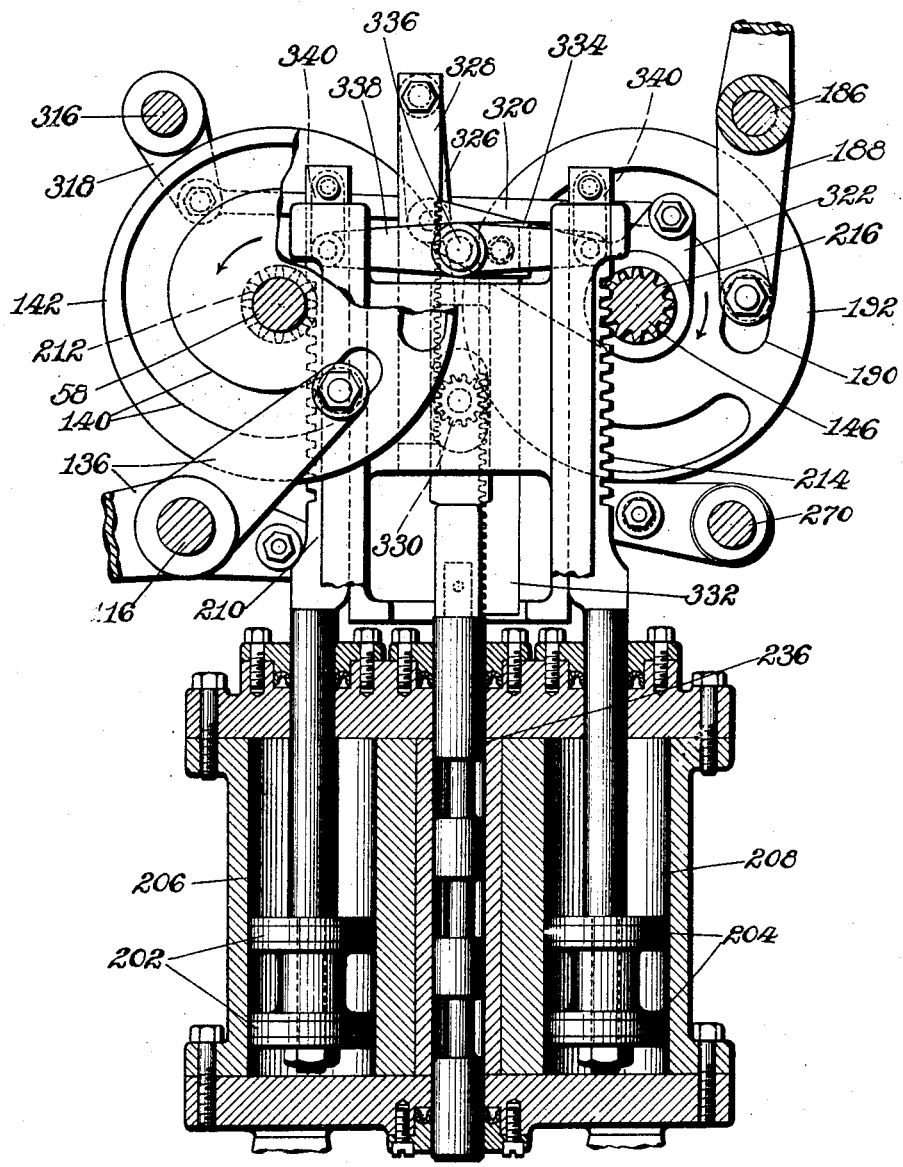
Fig. 8 is a section on the line 8—8 of Fig. 4 showing the fluid-pressure operating means together with the main controlling valve and its operating connections.
Figure 11:
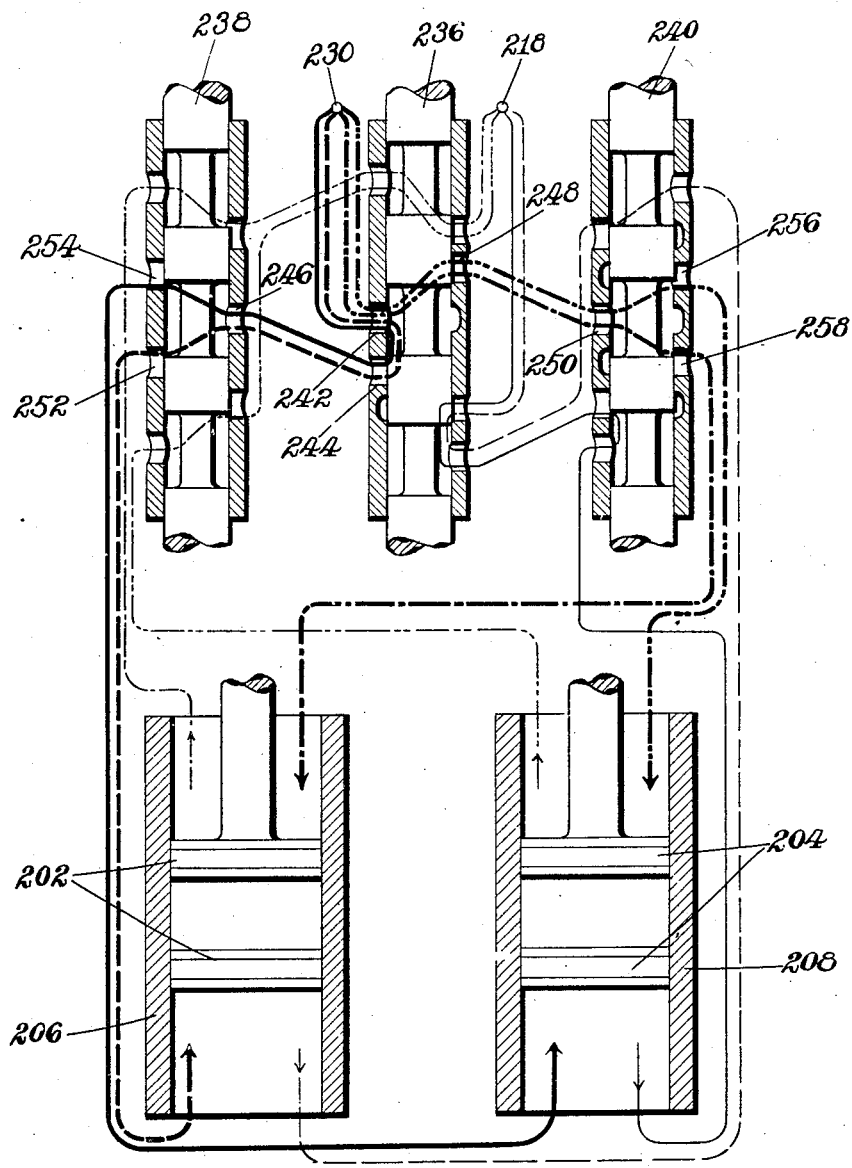
Fig. 11 is a diagrammatic view of the fluid-pressure operating means and the several valves for controlling the flow of the operating fluid.

For controlling the flow of the operating fluid to and from the cylinders 206 and 208 there are provided three cylindrical plunger valves shown respectively in Figs. 7, 8 and 9. The ports or openings controlled by the different valves and the passageways affording communication between the valves and the cylinders are omitted from the detail drawings but are shown diagrammatically in Fig. 11 which illustrates the relations of the valves to one another and to the cylinders and shows the different paths taken by the operating fluid at different times in the cycle in the passage of the fluid from the reservoir 230 to the cylinders and in the exhaust of the fluid from the cylinders to the reservoir 218. The main valve 236 (Figs. 8 and 11) is a manually operated valve for controlling the passage of the fluid from the reservoir 230 either to the valve 238 (Figs. 9 and 11) or to the valve 240 (Figs. 7 and 11). The valve 238 is automatically controlled at all times and may be termed the forward switch valve, since it controls the forward or operative movements of the machine by admission of the operating fluid to the lower ends of the cylinders 206 and 208 and determines the times when the fluid is admitted to the different cylinders. The valve 240 likewise is automatically controlled at all times and may be termed the reverse switch valve, since it controls the admission of the operating fluid to the upper ends of the cylinders 206 and 208 for reversing the operation of the machine and determines the times when the fluid is thus admitted to these cylinders. It will be seen by reference to Fig. 11 that the fluid from the reservoir 230 passes to the valve 236 through a port 242, and that it passes thence through ports 244 and 246 to the valve 238, or through ports 248 and 250 to the valve 240, as determined by the position of the valve 236. From the valve 238 the fluid passes either through a port 252 to the lower end of the cylinder 206, or through a port 254 to the lower end of the cylinder 208, as determined by the position of the valve 238. From the valve 240 the fluid passes either through a port 256 to the upper end of the cylinder 204, or through a port 258 to the upper end of the cylinder 206, as determined by the position of the valve 240. By manipulation of the valve 236 the operator is enabled to start, stop or reverse the machine at any time, but he is not enabled otherwise to vary in any respect the sequence of operations, since the movements of the cam shafts 58 and 146 in relation to each other, in both the forward and the reverse movements of the machine, are determined by the automatic valve mechanism.

For automatically controlling the valve 238 to determine the sequence of operations in the forward movement of the machine, there is provided mechanism shown in detail in Fig. 9. The valve 238 carries at its upper end a pinion 260 engaged on its opposite sides respectively by segment gears 262 and 264 formed on levers 266 and 268 which are loosely mounted respectively on the shaft 116 and on a shaft 270. Pivotally connected to the lever 266 is a yoke member 272 which is guided by a collar on the shaft 58 and carries a roll 274 engaged by a path-cam 276 formed in one side of the cam wheel 124. Pivotally connected to the lever 268 is a yoke member 278 which is guided by a collar on the cam shaft 146 and is provided with a roll 280 engaged by a path-cam 282 formed in one side of the cam wheel 192. It will be seen that the path-cam 276 is so shaped as to lift the lever 266 at different times in the cycle, thereby lifting the valve 238 by rolling the pinion 260 along the gear 264. This serves to open the port 254 and to close the port 252 to shift the flow of the fluid from the lower end of the cylinder 206 to the lower end of the cylinder 208. The path-cam 282 is shaped, as shown in Fig. 9, to lower the lever 268 at different times in the cycle, thereby lowering the valve 238 to open the port 252 and close the port 254. By the co-operative action of the levers 266 and 268 the position of the valve 238 is thus automatically determined at all times, the cams 276 and 282 being so formed in relation to the wiper-advancing and closing cams and to the eccentric 144 as to cause the operative movements of the machine to occur in the required relation to one another by directing the operating fluid to the cylinders 206 and 208 at the required times.

The sequence of operations of the machine may be better understood by reference to Fig. 13 which illustrates diagrammatically the movements of the wipers, and by reference also to Fig. 9 on which switching points in the operations of the valve-controlling cams 276 and 282 are indicated by the same reference characters as on Fig. 13. When the valve 236 is first lowered to start the machine the port 252 (Fig. 11) stands open, so that the fluid passes to the lower end of the cylinder 206 and by raising the piston 202 turns the cam-shaft 58 to move the toe rest 24 up into clamping position and to advance and close the wipers about the toe, this movement of the wipers being represented by the line a—b (Fig. 13). Substantially at the end of this advancing and closing movement of the wipers, at point b on cam 276, the valve 238 is raised by this cam to close the port 252 and open the port 254, these ports being so arranged that the one is opened slightly before the other is closed so as to avoid stalling the machine. The fluid then passes to the lower end of the cylinder 208, and by operating the cam shaft 146 while the shaft 58 is idle raises the wipers to upwipe the upper, carrying them from point b to point c (Fig. 13) where they are in position to begin their advancing and closing movement over the insole with safe clearance to avoid displacing the feather of the insole. When the wipers in this upward movement have arrived substantially at the edge of the insole the wiper advancing and closing connections are locked by the cam 190 so as to render the springs 126 and 134 inoperative in the overwiping operation, as hereinbefore explained. Substantially at the point c the valve 238 is lowered by the cam 282 (Fig. 9) to shift the flow of the fluid from the port 254 to the port 252 to cause the cam-shaft 58 to be turned far enough to advance and close the wipers over the extreme outer edge of the feather of the insole, this movement of the wipers being represented by the line c—d (Fig. 13). At the point d on the cam 276 the flow of the fluid is again shifted to the cylinder 208, and the cam-shaft 146 is thereby operated to turn the eccentric 144 beyond its upper dead center, bringing the wipers down with substantial pressure upon the upper through compression of the spring 156, as represented by the line d—e (Fig. 13). The flow is then again shifted (at e on cam 282) to the cylinder 206 and the wipers are advanced and closed to wipe the upper materials under pressure inwardly against the rib of the insole, this overwiping operation being represented by the line e—f. At the point f (Fig. 9) the flow is again shifted by cam 276 to the cylinder 208 and the eccentric 144 is further operated to produce a final heavy downward pressure of the wipers upon the upper materials through compression of the spring 158, as represented by the line f—g. It will thus be seen that the cam 276 at three points, b, d and f, switches the fluid from cylinder 206 to cylinder 208 to cause an upward or a downward movement of the wipers, and that the cam 282 at two points, c and e, switches the fluid back to cylinder 206 to cause an advancing and closing movement of the wipers.

The reverse switch valve 240 is controlled by mechanism shown in Fig. 7, of the same general character as that hereinbefore described for controlling the forward valve 238. At its upper end the valve 240 carries a pinion 284 which is engaged on opposite sides by segment gears 286 and 288 formed on levers 290 and 292 loosely mounted respectively on the shafts 116 and 270. Pivotally connected to the lever 290 is a yoke member 294 which is guided by a collar on the shaft 58 and carries a roll 296 engaged by a path-cam 298 formed in one side of the cam wheel 56. Pivotally connected to the lever 292 is a yoke member 300 which is guided by a collar on the shaft 146 and carries a roll 302 engaged by a path-cam 304 formed in one side of a cam wheel 306 which is fast on the cam-shaft 146. It will thus be seen that the position of the valve 240 is determined at all times by the co-operative action of the cams 298 and 304 through the segment gears 286 and 288.

The reverse cams 298 and 304 are so formed that the wipers, in withdrawing from the shoe, follow a path which, for the most part, is different from the path of their operative movement, as indicated by dotted lines on Fig. 13. When the wipers are at the end of their operative movement, represented by the point $g$, the reverse valve 240 is so positioned as to open the port 256, and when the valve 236 is raised to start the reverse movement of the machine, the fluid passes through port 256 to the upper end of cylinder 208 to reverse the movement of cam shaft 146, the roll 302 at that time being positioned substantially at the point $g$ in cam 304 (Fig. 7). The wipers are thus raised to point $h$ (Fig. 13) before they begin to back off from over the feather of the insole, the point $h$ corresponding in height to the point $c$ in the operative movement of the wipers. At point $h$ (Fig. 7) the cam 304 lowers the valve 240 to close port 256 and open port 258, thus switching the fluid to cylinder 206 to reverse the cam shaft 58. The wipers then receive an opening and retracting movement from over the shoe, represented by the line $h$—$i$, the path of this movement coinciding only from $d$ to $c$ with the path previously taken by the wipers in advancing and closing over the edge of the insole. At $i$ (Fig. 7) the cam 298 acts to raise the valve 240 and thus to switch the fluid again to cylinder 208, whereupon the wipers are lowered from $i$ to $j$. At this point the cam 304 acts to lower valve 240 again, switching the fluid to cylinder 206, as the result of which the wipers are retracted from point $j$ to their starting point $a$ in a path coincident with that of their previous forward movement and the toe rest also is lowered to starting position. It will be understood that during this reversal of the machine the forward valve 238 is operated idly by its cams, the operating fluid being cut off by the valve 236 from the port 244.

It will be evident by reference to Fig. 13 that movement of the wipers reversely in the path above described serves to avoid danger of displacing or loosening the upper after lasting, since they are positioned substantially out of rubbing contact with the upper both in backing off from over the insole and in lowering to their starting level.

As hereinbefore explained, the valve 236 is constantly under the operator's control, so that instead of waiting until the wipers have arrived at the end of their operative movement before reversing the machine, he may reverse at any time. If reversal is thus effected at some intermediate point, the path taken by the wipers at the start of such reversal will depend upon the positions of the reverse cams 298 and 304. It will be borne in mind that the reverse cam 298 bears a fixed relation to the forward cam 276 and that the reverse cam 304 bears a fixed relation to the forward cam 282, so that for any position of either forward cam there is a correspondingly predetermined position of that reverse cam which controls the same kind of movement of the wipers, i. e., their vertical movement or their horizontal movement. With reference again to Fig. 13, in comparison with Figs. 7 and 9, it will be evident that if at any time in the forward movement of the wipers from $a$ to $b$ the operator reverses the machine, the wipers will be retracted in the same path, since it will be recalled that at the end of the complete reversal of the machine above described the reverse valve 240 was in lowered position with port 258 open to admit the fluid to cylinder 206, and although the movement of the two cams 276 and 298 corresponding to the forward wiper movement represented by the line $a$—$b$ (Fig. 13) results in further lowering of the reverse valve 240 by the action of cam 298 at point $i$, this is an idle movement of the valve which does not alter conditions affecting the flow of the fluid. When the cam shaft 58 comes to a stop at $b$, the valve 240 is thus set to cause the wipers to retract from the shoe in a horizontal path, and this condition continues throughout the upwiping movement of the wipers from $b$ to $c$, since the cam 304 acts at $j$ to raise the valve 240 only a distance equal to that of the excess downward movement previously effected by cam 298 at $i$. If, therefore, the operator reverses the machine at any time in the upwiping movement of the wipers, the latter are first retracted from the shoe in a horizontal path and are then lowered along the line $i$—$j$ to the line $a$—$b$. This is true also of reversal at any time in the short inward movement of the wipers along the line $c$—$d$, since the valve 240 is not raised to switch the fluid to cylinder 208 until it is acted upon by cam 304 at point $h$ (Fig. 7) and this does not occur until after the cam shaft 146 has been started in response to the action of the forward cam 276 at point $d$ to effect downward compressing movement of the wipers. As soon as the wipers begin their downward movement from point $d$ the valve 240 is set by cam 304 to move them upwardly again to the level of line $c$—$d$ if the machine is reversed. It will be observed that from this point on to the end of the travel of cams 298 and 304 there is nothing in the shape of these cams which causes any further shift in the position of the valve 240, and therefore reversal effected at any time in the operative movement of the wipers from point $d$ to point $g$ results in immediate upward movement of the wipers to the line $i$—$h$ before they are backed off from over the shoe. It will be understood that after arriving in the position indicated by the line $i$—$h$, the wipers in their further reverse movement follow the same path as in complete reversal of the machine from point g.

It remains to consider what movement of the wipers first takes place in case the operator, after having partially reversed the machine and before the wipers have been retracted to starting position, sets the valve 236 to go forward again. It will be recalled that at the end of the operative movement of the wipers, represented by point g, the forward valve 238 is in raised position with port 254 open to admit fluid to cylinder 208. In the reversal of the machine from g to h (see cam 304, Fig. 7) the valve 238 remains in this condition, since although cam 282 (Fig. 9) acts at e in its reverse movement to raise valve 238 still farther, this does not alter conditions affecting the flow of the fluid. If at any time, therefore, in the reverse movement of the wipers from g up to point h the operator sets the valve 236 to go forward again, the wipers are immediately moved down in the same path. When the shift occurs at h, the cam shaft 58 starts its reverse movement and the cam 276 acts at f to lower valve 238 a distance only equal to that of the excess upward movement imparted to it by cam 282 at point e. Not until after point d on cam 276 is reached is the valve 238 lowered enough to close port 254 and open port 252. If, therefore, the operator starts the machine forward again at any time in the reverse movement of the wipers from h to d, the wipers are immediately moved down to the line e—f before receiving their advancing and closing movement. The operator may thus cause the machine to repeat the overwiping and downward pressing movements of the wipers, or any portion of such movements, as many times as desired without backing the wipers entirely off from over the shoe. If the machine is reversed beyond point d, the valve 238 is lowered to open port 252, so that if the machine were started forward again the wipers would first advance and close along line c—d. If the reversal of the machine is continued to point i, the valve 238 remains in condition to cause the wipers to go forward again in a horizontal path, since the action of cam 276 at point b is simply to impart an excess downward movement to the valve, the port 252 remaining open. At i the cam shaft 146 is started again to move the wipers down from i to j. In this movement the cam 282 acts at c to raise valve 238, but only for a distance corresponding to that of the excess downward movement above mentioned. If, therefore, the machine is again started forward at any time in the reversal from i to j, the wipers are immediately advanced and closed about the toe before receiving any upwiping movement. The entire upwiping movement of the wipers, or any part of such movement, may thus be repeated as many times as desired. If reversal is continued back to the starting point a, the valve 238 still remains in position to cause horizontal movement of the wipers, since there is nothing in the shape of the forward cams after points b and c are passed in reversal to alter the position of the valve.

When the operating fluid is admitted to either end of either of the cylinders 206 and 208 for effecting any of the movements of the machine as hereinabove described, a passage is always provided for the exhaust of the fluid from the opposite end of the same cylinder to the reservoir 218 through ports controlled by the valves, as will be clearly evident by reference to Fig. 11 where the path of the exhaust from each end of each of the cylinders is represented by one of the lighter lines of the same character as the heavier line representing the path of the operating fluid into the same end of the cylinder. The ports through which the exhaust of the fluid back to the reservoir 218 takes place under different operating conditions, and the manner in which these ports are controlled by the valves 236, 238 and 240 are clearly indicated on Fig. 11, and no detailed description of these various ports and co-operating valve parts is necessary for an understanding of this part of the operation of the machine.

The main valve 236 is controlled manually by a hand lever 308 which is fast on the upper end of a rock shaft 310 provided at its lower end with a spiral gear 312 which engages and operates a spiral gear 314 loosely mounted on a shaft 316 upon which is also mounted the bell-crank 48, 50 hereinbefore mentioned. Rigidly connected to the gear 314 is a crank-arm 318 (Figs. 8 and 9) which is connected by a link 320 to one arm 322 of a bell-crank loosely mounted on the shaft 146, the other arm 324 of this bell-crank being connected by a link 326 to the upper end of a vertically slidable rack bar 328 engaging a pinion 330 carried by the upper end of the valve 236. On the opposite side from the rack bar 328 the pinion 330 is engaged by another vertically movable rack bar 332 controlled as hereinafter explained. The parts are so arranged that when the operator swings the hand lever 308 toward him as he stands in front of the machine the valve 236 is moved downwardly by the action of the rack bar 328 in rolling the pinion 330 along the rack bar 332, so that the port 244 is opened to cause operative forward movement of the machine to take place. Similarly, when the operator swings the hand lever in the opposite direction the valve 236 is raised to open the port 248 and thus to cause a reversal of the machine.

It is an important useful feature of the machine that the valve 236 is controlled automatically as well as manually. To this end, the rack bar 332 is provided at its upper end with an arm 334 upon which is pivotally mounted at 336 a lever 338, the opposite ends of this lever being connected respectively by links 340, at points equidistant from the fulcrum point, with the upper ends of the operating rack bars 210 and 214 through which movements are imparted to the cam shafts 58 and 146. It will thus be seen that when either of the rack bars 210 or 214 is moved upwardly in the operation of the machine, the rack bar 332 also is moved upwardly and by rolling the pinion 330 along the rack bar 328 raises the valve 236 enough to close the port 244 and thus stop the machine unless the operator is at the same time moving the hand lever 308 toward him at such speed as to counteract this tendency to close the port.

It will thus be evident that for every position of the hand lever 308 within the range of its operative movement there is a corresponding stopping position of the machine. By continuous movement of the hand lever the operator may cause the machine to run continuously until the operations upon the shoe have been completed, while at the same time maintaining the valve 236 under such control that by stopping the movement of the hand lever at any point desired he may cause the machine almost instantly to come to a stop at the point thus determined. In a similar way the operator is enabled to control the reverse movement of the machine and to bring the machine to a stop at any point desired. The limit of movement of the hand lever 308 toward the operator is determined by a stop screw 342, and when the hand lever arrives in position to engage this stop screw the machine is brought to a stop automatically with the wipers at the limit of their downward pressing movement represented by the point $g$ on Fig. 13. The machine will be provided with a similar stop to limit the movement of the hand lever in the opposite direction.

It will also be evident that by the speed of movement of the hand lever 308 the operator is enabled to determine, within limits, the speed of the machine in either forward or reverse movement. The speed of the machine will depend, of course, upon how widely the port 244 or the port 248 is opened, and the more widely either of these ports is opened, the faster the rack bar 332 will be operated. To cause the machine to run at a uniform rate of speed, the rack bar 328 must be moved at the same rate, whether fast or slow, as the rack bar 332, while to change the speed the rack bar 328 must be moved faster or slower than the rack bar 332. In practice the operator will naturally accustom himself to move the hand lever at a gradual and substantially uniform rate of speed, as if he were actually operating the machine by hand, the speed being slow enough to permit the machine to be brought to a stop at any point almost instantly by merely stopping the movement of the hand lever or, if preferred, by giving it a very slight reverse movement.

From the foregoing description it will be understood that while all the operations of the machine are performed by power and the shoe may thus be subjected to as heavy pressures as are needed to produce the best results without manual labor on the part of the operator, the machine nevertheless is under such control that each shoe may readily be subjected to such individual treatment as the operator deems necessary from his observation of the shoe as the operation of the machine proceeds. During the upwiping operation, for example, or at any time between or during repeated upwiping operations on the shoe, the operator may manipulate the margin of the upper by the use of hand pincers or a retarder, as customary heretofore in bed lasting machines. As hereinbefore explained, either the upwiping operation or the overwiping operation, or both these operations, may be readily repeated as many times as desired. After the upper materials have been wiped properly into lasted position, the wipers may be raised sufficiently to permit a binder wire to be readily drawn into place beneath them and the machine may then be stopped until the binder has been applied. Thereafter, if desired, the machine may be started forward to subject the upper materials again to downward pressure before the wipers are finally retracted to starting position.

While the invention is herein illustrated in its application to welt shoe work, it will be understood that the invention is not limited in utility to that kind of work but is likewise applicable to the lasting of various kinds of shoes.

Having described the invention, what I claim as new and desire to secure by Letters Patent of the United States is:—

1. A machine for shaping upper materials over a form having, in combination, upper shaping mechanism, power-driven means for effecting relative movement of said upper shaping mechanism and the form to shape the upper materials, and controlling means for bringing the machine to a stop at any point in the relative movement of said upper shaping mechanism and the form comprising a manually operated member adapted to determine variably by the extent of its movement the stopping position of the machine.

2. A machine for shaping upper materials over a form having, in combination, upper shaping mechanism, power-driven means for effecting relative movement of said upper shaping mechanism and the form to shape the upper materials, means for starting said power-driven means in operation comprising a manually operated member movable different distances in the same direction as determined by the operator, and automatic means co-operating with said manually operated member to bring said power-driven means to a stop after movement of varying extent determined by the extent of the movement of said manually operated member.

3. A machine for shaping upper materials over a form having, in combination, upper shaping mechanism, power-driven means for effecting relative movement of said upper shaping mechanism and the form to shape the upper materials, and controlling means comprising co-operating members, one operated manually and the other by power, to cause said power-driven means to continue its operative movement as long as movement is imparted to said manually operated member and to bring said means to a stop when the movement of said manually operated member is stopped.

4. A machine for shaping upper materials over a form having, in combination, upper shaping mechanism, power-driven means for effecting relative movement of said upper shaping mechanism and the form to shape the upper materials, a manually operated member movable to start said power-driven means in operation and adapted to be moved continuously during the operation of the machine, and means co-operating with said manually operated member to cause said power-driven means to operate at a rate of speed determined by the speed of the movement of said member.

5. A machine for shaping upper materials over a form having, in combination, upper shaping mechanism, power-driven means for effecting relative movement of said upper shaping mechanism and the form to shape the upper materials, and means for starting the machine in operation and for thereafter reversing it at any point in its operation at the will of the operator comprising a manually operated member and mechanism co-operating therewith to limit variably as determined by the extent of the movements of said member in opposite directions respectively the extent of the forward and reverse movements of the machine.

6. A machine for shaping upper materials over a form having, in combination, upper shaping mechanism, power-driven means for effecting relative movement of said upper shaping mechanism and the form to shape the upper materials, and controlling mechanism for starting the machine in operation and for reversing it at the will of the operator comprising a manually operated member movable in opposite directions respectively to start and to reverse the machine and means co-operating with said member to cause the machine to run in either a forward or a reverse direction at a rate of speed determined by the speed of the movement of said member.

7. A machine for shaping upper materials over a form having, in combination, upper shaping mechanism, fluid-pressure means for effecting relative movement of said upper shaping mechanism and the form to shape the upper materials, valve mechanism for controlling said fluid-pressure means, and means for controlling said valve mechanism to bring the machine to a stop at any point in its operative movement comprising a manually operated member adapted to determine variably by the extent of its movement the stopping position of the machine.

8. A machine for shaping upper materials over a form having, in combination, upper shaping mechanism, fluid-pressure means for effecting relative movement of said upper shaping mechanism and the form to shape the upper materials, valve mechanism for controlling said fluid-pressure means, a manually operated member for operating said valve mechanism to start the machine, and automatic means for controlling said valve mechanism to stop the machine after movement of varying extent depending upon the extent of the movement of said manually operated member.

9. A machine for shaping upper materials over a form having, in combination, upper shaping mechanism, fluid-pressure means for effecting relative movement of said upper shaping mechanism and the form to shape the upper materials, valve mechanism for controlling said fluid-pressure means, power-operated means tending constantly during the operation of the machine to move said valve mechanism into position to stop the machine, and manually operated means adapted by continuous movement at the will of the operator to counteract the tendency of said power-operated means to stop the machine.

10. A machine for shaping upper materials over a form having, in combination, upper shaping mechanism, fluid-pressure means for effecting relative movement of said upper shaping mechanism and the form to shape the upper materials, valve mechanism for controlling said fluid-pressure means, and means for controlling said valve mechanism comprising a manually operated member and a member operated by said fluid-pressure means co-operating to keep the machine in operation as long as movement is imparted to said manually operated member and to bring the machine to a stop when the movement of said manually operated member is stopped.

11. A machine for shaping upper materials over a form having, in combination, upper shaping mechanism, fluid-pressure means for effecting relative movement of said upper shaping mechanism and the form to shape the upper materials, valve mechanism for controlling said fluid-pressure means, a manually operated member for controlling said valve mechanism adapted to be moved continuously during the operation of the machine, and automatic valve controlling means co-operating with said manually operated member to cause the machine to run at a rate of speed variable in accordance with the speed of said member.

12. A machine for shaping upper materials over a form having, in combination, upper shaping mechanism, fluid-pressure means for effecting relative movement of said upper shaping mechanism and the form to shape the upper materials, valve mechanism for controlling said fluid-pressure means, and means for controlling said valve mechanism comprising oppositely acting members, one operated manually and the other by said fluid-pressure means, for starting and stopping the machine respectively, and connections between said members and the valve mechanism constructed to keep the machine in operation at a uniform rate of speed in response to simultaneous movements of said members at predetermined relative rates of speed and to vary the speed of the machine in response to variations in the ratio between the rates of speed of said members.

13. A machine for shaping upper materials over a form having, in combination, upper shaping mechanism, fluid-pressure means for effecting relative movement of said upper shaping mechanism and the form to shape the upper materials, a valve for controlling said fluid-pressure means, manually operated means for moving said valve in one direction different distances at the will of the operator to start the machine, and power-operated means operative continuously during the operative movement of the machine and arranged to move said valve in the opposite direction to stop the machine at a point depending upon the distance of the movement of the valve by the manually operated means.

14. A machine for shaping upper materials over a form having, in combination, upper shaping mechanism, fluid-pressure means for effecting relative movement of said upper shaping mechanism and the form to shape the upper materials, a valve for controlling said fluid-pressure means, and rack and pinion mechanism comprising oppositely acting rack members, one operated manually and the other by said fluid-pressure means, for moving said valve respectively in opposite directions to start and stop the machine.

15. A machine for shaping upper materials over a form having, in combination, upper shaping mechanism, fluid-pressure means for effecting relative movement of said upper shaping mechanism and the form to shape the upper materials, valve mechanism for controlling said fluid-pressure means, and mechanism operated by said fluid-pressure means for automatically controlling said valve mechanism.

16. A machine for shaping upper materials over a form having, in combination, upper shaping mechanism, fluid-pressure means for effecting relative movement of said upper shaping mechanism and the form to shape the upper materials, a valve for controlling said fluid-pressure means, rack and pinion mechanism comprising oppositely acting rack members, one operated manually and the other by said fluid-pressure means, for moving said valve respectively in opposite directions to start and stop the machine, said fluid-operated rack member being movable continuously at all times when the machine is in operation, and said manually operated rack member being movable at the will of the operator to counteract the tendency of said fluid-operated member to stop the machine.

17. A machine for shaping upper materials over a form having, in combination, upper shaping mechanism, fluid-pressure means for effecting relative movement of said upper shaping mechanism and the form to shape the upper materials, valve mechanism for controlling said fluid-pressure means, and means for controlling said valve mechanism to start and to stop or reverse the machine at any point in its operation at the will of the operator comprising a manually operated member and mechanism co-operating therewith to limit variably as determined by the extent of the movements of said member in opposite directions respectively the extent of the forward and reverse movements of the machine.

18. A machine for shaping upper materials over a form having, in combination, upper shaping mechanism, fluid-pressure means for effecting relative movement of said upper shaping mechanism and the form to shape the upper materials, valve mechanism for controlling said fluid-pressure means, and means for controlling said valve mechanism to start and to stop or reverse the machine at any point in its operation at the will of the operator comprising a manually operated member adapted to be moved continuously in a forward or a reverse direction during corresponding forward or reverse movement of the machine and to determine by the speed of its movement in either direction the speed of movement of the machine.

19. A machine for shaping upper materials over a form having, in combination, upper shaping mechanism, fluid-pressure means for effecting relative movement of said upper shaping mechanism and the form to shape the upper materials, valve mechanism movable in opposite directions respectively to cause forward and reverse movements of the machine, and means automatically operative in either forward or reverse movement of the machine for returning said valve mechanism to a neutral position to stop the machine.

20. A machine for shaping upper materials over a form having, in combination, upper shaping mechanism, fluid-pressure means for effecting relative movement of said upper shaping mechanism and the form to shape the upper materials, valve mechanism movable in opposite directions respectively to cause forward and reverse movements of the machine, means automatically operative in either forward or reverse movement of the machine for returning said valve mechanism to a neutral position to stop the machine, and manual means enabling the operator by movement of said valve mechanism at will during forward or reverse movement of the machine to prevent the stopping of the machine.

21. A machine for shaping upper materials over a form having, in combination, upper shaping mechanism, fluid-pressure means for effecting relative movement of said upper shaping mechanism and the form to shape the upper materials, a valve movable in opposite directions respectively to cause forward and reverse movements of the machine, rack and pinion mechanism comprising a manually operated rack member for moving the valve in either of said directions, and a power-operated rack member automatically operative in either forward or reverse movement of the machine for returning said valve to a neutral position to stop the machine.

22. A machine for shaping upper materials over a form having, in combination, toe-embracing wipers, power-operated means for effecting relative movements of said wipers and the form in automatically determined sequence to upwipe and to overwipe the upper materials, and controlling mechanism enabling the operator to bring the machine to a stop at any point in the upwiping or the overwiping operation comprising a manually operated member adapted to determine by the extent of its movement at what point in the operation the machine is brought to a stop.

23. A machine for shaping upper materials over a form having, in combination, toe-embracing wipers, power-operated means for effecting relative movements of said wipers and the form in automatically determined sequence to upwipe and to overwipe the upper materials, and controlling mechanism comprising co-operating manual and automatic means for determining the speed of the machine by the speed of movement of said manual means and for bringing the machine to a stop at any point as determined by the extent of the movement of said manual means.

24. A machine for shaping upper materials over a form having, in combination, toe-embracing wipers, power-operated means for effecting relative movements of said wipers and the form in automatically determined sequence to upwipe and to overwipe the upper materials, a manually operated member movable in opposite directions respectively to start and to reverse the machine at the will of the operator, and mechanism co-operating with said member to cause the machine to run in either direction as long as said member is moved in the corresponding direction and to come to a stop when the movement of said member is stopped.

25. A machine for shaping upper materials over a form having, in combination, toe-embracing wipers, power-operated means for effecting in automatically determined sequence relative upwiping and overwiping movements of said wipers and the form, and controlling means for stopping the machine at any point in its operation and for causing it to repeat at the will of the operator any portion of the relative upwiping or overwiping movement of the wipers and the form.

26. A machine for shaping upper materials over a form having, in combination, toe-embracing wipers, power-operated means for effecting relative movement of said wipers and the form heightwise of the toe to upwipe the upper materials, controlling means for reversing the operation of the machine at an intermediate point in the upwiping operation at the will of the operator, and mechanism automatically operative upon such reversal of the machine to retract the wipers from the upper materials prior to relative reverse movement of the wipers and the form heightwise of the toe.

27. A machine for shaping an end portion of upper materials over a form having, in combination, end-embracing wipers, power-operated means for operating said wipers to wipe the upper materials inwardly over the bottom of the form while applying pressure to said materials toward the bottom face of the form, controlling means for reversing the operation of the machine at an intermediate point in the overwiping and pressing operation of the wipers at the will of the operator, and mechanism automatically operative upon such reversal of the machine to effect relative movement of the wipers and the form heightwise of the form prior to retractive movement of the wipers along the plane of their wiping faces.

28. A machine for shaping upper materials over a form having, in combination, toe-embracing wipers, power-operated means for effecting in automatically determined sequence relative movements of said wipers and the form to upwipe the upper materials and to wipe said materials inwardly over the bottom of the form with pressure directed toward the bottom face of the form, controlling means for reversing the operation of the machine at the will of the operator at an intermediate point in said upwiping operation or in said overwiping and pressing operation, and mechanism automatically operative at the beginning of any such reversal of the machine to effect relative separating movement between the active wiping surface of the wipers and that portion of the upper materials engaged by said surface.

29. A machine for shaping upper materials over a form having, in combination, end-embracing wipers, power-operated means for effecting relative movement of said wipers and the form in an automatically determined path to upwipe the upper materials, controlling means for enabling the operator at will to reverse the operation of said power-operated means preparatory to repeating the upwiping operation, and mechanism automatically operative upon such reversal of the power means to effect relative reverse movement of the wipers and the form in a different path from the operative movement to prevent substantially reverse rubbing action of the wipers on the upper materials.

30. A machine for shaping an end portion of upper materials over a form having in combination, end-embracing wipers, power-operated means for effecting relative movement of said wipers and the form to wipe the upper materials inwardly over the bottom of the form, controlling means for enabling the operator at will to reverse the operation of said power-operated means after the beginning of the over-wiping operation, and mechanism automatically operative upon such reversal of the power means to effect relative reverse movement of the wipers and the form in a different path from the operative movement to prevent substantially reverse rubbing action of the wipers on the upper materials.

31. A machine for shaping upper materials over a form having, in combination, upper shaping mechanism, operating mechanism comprising a plurality of fluid-operated plungers for effecting respectively different relative movements of said upper shaping mechanism and the form, and an automatically controlled switch-valve for determining the times when the operating fluid is directed to the different plungers to cause the relative movements of the upper shaping mechanism and the form to occur in automatically determined relation to one another.

32. A machine for shaping upper materials over a form having, in combination, upper shaping mechanism, operating mechanism comprising a plurality of fluid-operated plungers for effecting respectively different relative movements of said upper shaping mechanism and the form, and valve mechanism operated by said plungers for controlling the flow of the operating fluid to said plungers.

33. A machine for shaping upper materials over a form having, in combination, upper shaping mechanism, operating mechanism comprising a plurality of fluid-operated plungers for effecting respectively different relative movements of said upper shaping mechanism and the form, an automatically controlled switch-valve for determining the times when the operating fluid is directed to the different plungers to cause the relative movements of the upper shaping mechanism and the form to occur in automatically determined relation to one another, and manually operated valve means for also controlling the flow of the fluid to enable the operator to stop the machine at any point in its operation.

34. A machine for shaping upper materials over a form having, in combination, upper shaping mechanism, operating mechanism comprising a plurality of fluid-operated plungers for effecting respectively different relative movements of said upper shaping mechanism and the form, automatically controlled valve means for determining the times when the operating fluid is directed to the different plungers to cause the relative movements of the upper shaping mechanism and the form to occur in automatically determined relation to one another, a manually operated valve for also controlling the flow of the fluid, said manually operated valve being movable different distances at the will of the operator, and mechanism operated by said plungers for controlling said manually operated valve automatically to bring the machine to a stop at any one of a plurality of points in its operation depending upon the extent of the manual movement of said manually operated valve.

35. A machine for shaping upper materials over a form having, in combination, upper shaping mechanism, operating mechanism comprising a plurality of fluid-operated plungers for effecting respectively different relative movements of said upper shaping mechanism and the form, automatically controlled valve means for determining the times when the operating fluid is directed to the different plungers to cause the relative movements of the upper shaping mechanism and the form to occur in automatically determined relation to one another, a manually operated valve for also controlling the flow of the fluid, manual means for moving said valve different distances at the will of the operator, and a lever operatively connected to the different plungers and having means for imparting to said manually operated valve return movement in response to the movement of any one of said plungers for bringing the machine to a stop at a point in its operation depending upon the extent of the manual movement of the valve.

36. A machine for shaping upper materials over a form having, in combination, upper shaping mechanism, a plurality of cam shafts having means thereon for effecting respectively different relative movements of the upper shaping mechanism and the form, fluid-operated plungers for operating respectively the different cam shafts, valve mechanism for directing the operating fluid to the different plungers, and cams on said cam shafts for controlling said valve mechanism to determine the times when the fluid is directed to the different plungers to cause the relative movements of the upper shaping mechanism and the form to occur in automatically determined relation to one another.

37. A machine for shaping upper materials over a form having, in combination, upper shaping mechanism, a plurality of cam shafts having means thereon for effecting respectively different relative movements of the upper shaping mechanism and the form, fluid-operated plungers for operating respectively the different cam shafts, a switch valve for controlling the flow of the operating fluid to said plungers, and cams on said cam shafts for controlling said switch valve to direct the fluid to the different plungers at different times to cause the relative movements of the upper shaping mechanism and the form to occur in automatically determined relation to one another.

38. A machine for shaping upper materials over a form having, in combination, toe-embracing wipers, operating mechanism comprising a plurality of fluid-operated plungers for effecting respectively relative upwiping and overwiping movements of said wipers and the form, and automatically controlled valve means for determining the times when the operating fluid is directed to the different plungers to cause said relative movements of the wipers and the form to occur in automatically determined relation to one another.

39. A machine for shaping upper materials over a form having, in combination, toe-embracing wipers, operating mechanism comprising different fluid-operated plungers for imparting respectively to said wipers movements heightwise of the form to upwipe the upper and thereafter to press the upper toward the bottom face of the form and overwiping movement inwardly over the bottom of the form, and automatically controlled valve means for determining the times when the operating fluid is directed to the different plungers to cause the different movements of the wipers to occur in automatically determined relation to one another.

40. A machine for shaping upper materials over a form having, in combination, toe-embracing wipers, operating mechanism comprising different cams for imparting respectively to the wipers movements heightwise of the form to upwipe the upper and thereafter to press it toward the bottom face of the form and overwiping movement inwardly over the bottom of the form, fluid-operated plungers arranged respectively to operate said different cams, valve mechanism for directing the operating fluid to the different plungers, and cams arranged in predetermined relation to said operating cams for controlling said valve mechanism to determine the times when the operating fluid is directed to the different plungers to cause the different movements of the wipers to occur in automatically determined relation to one another.

41. A machine for shaping upper materials over a form having, in combination, toe-embracing wipers, operating mechanism comprising a plurality of cam shafts having means thereon for imparting respectively to the wipers movement heightwise of the form and movement inwardly over the bottom of the form, fluid-operated plungers connected respectively to the different cam shafts for operating them, a switch valve for directing the operating fluid to the different plungers, and cams on said cam shafts for controlling said switch valve to determine the times when the operating fluid is directed to the different plungers.

42. A machine for shaping upper materials over a form having, in combination, toe-embracing wipers, an operating shaft having means thereon for effecting relative movement of said wipers and the form heightwise of the form, a second operating shaft having means thereon for imparting to the wipers advancing and closing movements, and separate fluid-operated plungers for imparting operative movements respectively to said different shafts.

43. A machine for shaping upper materials over a form having, in combination, toe-embracing wipers, an operating shaft having means thereon for effecting relative movement of said wipers and the form heightwise of the form, a second operating shaft having means thereon for imparting to the wipers advancing and closing movements, separate fluid-operated plungers for imparting operative movements respectively to said different shafts, and valve mechanism controlled by said plungers for determining automatically the sequence of operations.

44. A machine for shaping upper materials over a form having, in combination, upper shaping mechanism, fluid-pressure means for effecting relative movements of said upper shaping mechanism and the form, automatically controlled valve mechanisms for controlling respectively the flow of the operating fluid to said fluid pressure mechanism in forward and reverse movements of the machine, and manually controlled means for directing the fluid to either of said valve mechanisms.

45. A machine for shaping upper materials over a form having, in combination, upper shaping mechanism, operating mechanism comprising a plurality of fluid-operated plungers for effecting respectively different relative movements of said upper shaping mechanism and the form, an automatically controlled switch valve for directing the operating fluid to said different plungers at different respective times in the forward movement of the machine, a second automatically controlled switch valve for directing the fluid to the different plungers in the reverse movement of the machine, and manually operated valve means for directing the fluid to either of said switch valves.

46. A machine for shaping upper materials over a form having, in combination, upper shaping mechanism, a plurality of cam shafts having means thereon for effecting respectively different relative movements of the upper shaping mechanism and the form, fluid-operated plungers arranged respectively to operate said different cam shafts, a switch valve for controlling the flow of the operating fluid to the different plungers in the forward movement of the machine, a second switch valve for controlling the flow of the fluid to the different plungers in reverse movement of the machine, cams on said cam shafts for controlling said switch valves, and manually operated valve means for directing the operating fluid to either of said switch valves.

47. A machine for shaping upper materials over a form having, in combination, upper shaping mechanism, operating mechanism comprising a plurality of fluid-operated plungers for effecting respectively different relative movements of said upper shaping mechanism and the form, an automatically controlled switch valve for directing the operating fluid to the different plungers to determine the sequence of operations of the machine, a second switch valve for controlling the flow of the fluid to the different plungers in reverse movement of the machine, and automatic means for controlling said reverse switch valve to cause reverse relative movement of the upper shaping mechanism and the form to take place in a different path from the forward relative movement.

48. A machine for shaping upper materials over a form having, in combination, upper shaping mechanism, a plurality of cam shafts having means thereon for effecting respectively different relative movements of the upper shaping mechanism and the form, fluid-operated plungers arranged respectively to operate said different cam shafts, switch valves arranged respectively to control the flow of the fluid to said plungers in forward and reverse movements of the machine, and forward and reverse cams on said cam shafts for controlling the different switch valves, said reverse cams being constructed to cause the relative reverse movement of the upper shaping mechanism and the form to take place in a different path from the relative forward movement.

49. A lasting machine having, in combination, shoe clamping mechanism arranged to apply clamping pressure to a shoe in the direction of its height, end-embracing wipers, and fluid-pressure means for operating said shoe clamping mechanism and wipers in automatically determined sequence.

50. A lasting machine having, in combination, shoe clamping mechanism, end-embracing wipers, different fluid-operated plungers for imparting operative movements respectively to said shoe clamping mechanism and wipers, and automatic means for controlling the flow of operating fluid to said plungers.

51. A toe lasting machine having, in combination, shoe clamping mechanism, toe-embracing wipers, an operating shaft having means thereon for operating said shoe clamping mechanism and for imparting to the wipers advancing and closing movements, a second operating shaft having means thereon for imparting to the wipers movement heightwise of the toe, and separate fluid-operated plungers for imparting operative movements respectively to said different shafts.

52. A machine for shaping upper materials over a form having, in combination, toe-embracing wipers, a support for said wipers, and a fulcrum member on which said wiper support is mounted for swinging movement heightwise of the toe to upwipe the upper, said member being movable to advance said support and wipers lengthwise of the toe to overwipe the upper, and different mechanisms for swinging and for advancing said support respectively to cause the wipers to effect the upwiping and overwiping operations.

53. A machine for shaping upper materials over a form having, in combination, toe-embracing wipers, a support for said wipers, a fulcrum member on which said wiper support is mounted for swinging movement heightwise of the toe, means for moving said member to advance said support and wipers lengthwise of the toe to overwipe the upper, and mechanism operative independently of said member for imparting closing movements to the wipers.

54. A machine for shaping upper materials over a form having, in combination, toe-embracing wipers, a support for said wipers mounted for swinging movement heightwise of the toe, and separate mechanisms for swinging said support to upwipe the upper, for advancing it lengthwise of the toe to overwipe the upper, and for closing the wipers about the toe.

55. A machine for shaping upper materials over a form having, in combination, end-embracing wipers, means for advancing and closing said wipers to wipe the upper materials inwardly over the bottom of the form, and means for pressing said wipers toward the bottom of the form comprising a light spring for applying pressure to the wipers in the overwiping operation and a heavier spring for applying final pressure to the wipers.

56. A machine for shaping upper materials over a form having, in combination, end-embracing wipers, means for advancing and closing said wipers to wipe an end portion of the upper materials inwardly over the bottom of the form, a comparatively light spring and a heavier spring for effecting relative movement of the form and the wipers heightwise of the form to press the upper upon the bottom of the form, and means for rendering first the light spring and then the heavier spring effective in the upper-shaping operation.

In testimony whereof I have signed my name to this specification.

ARTHUR F. PYM.